L. P. WRIGHT.
TICKET MACHINE.
APPLICATION FILED MAR. 17, 1920.

1,357,372.

Patented Nov. 2, 1920.
10 SHEETS—SHEET 1.

INVENTOR
L. P. Wright
BY
ATTORNEY

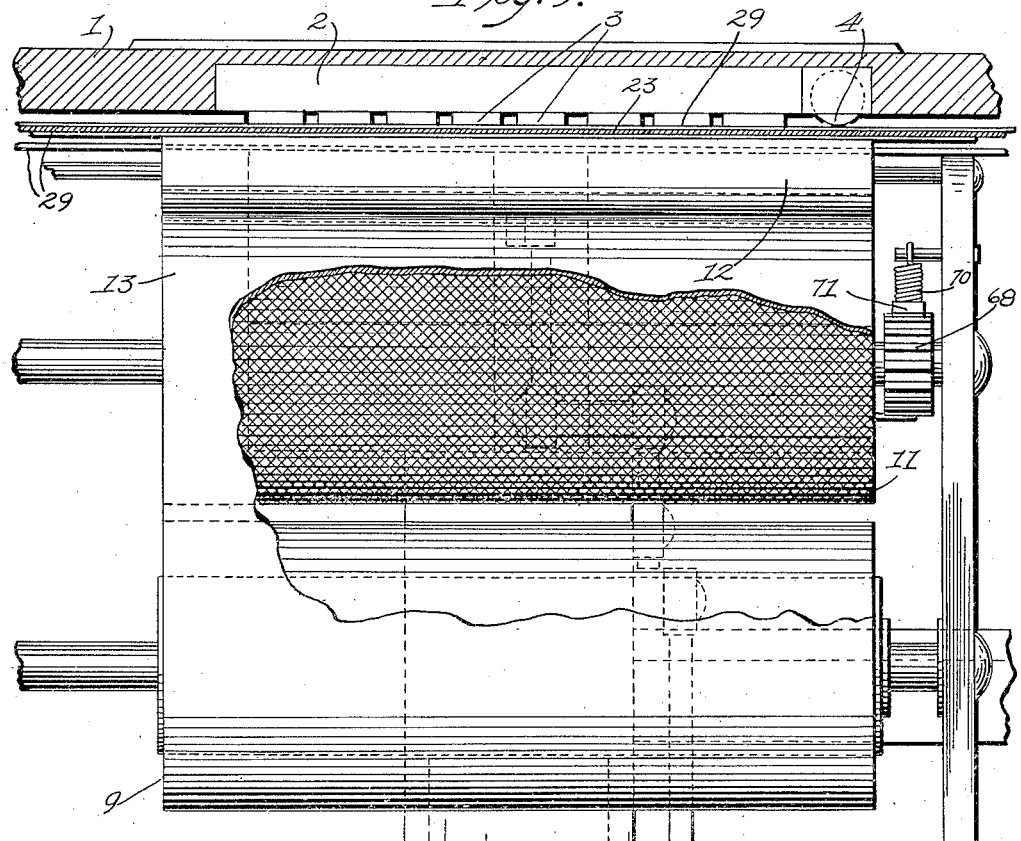
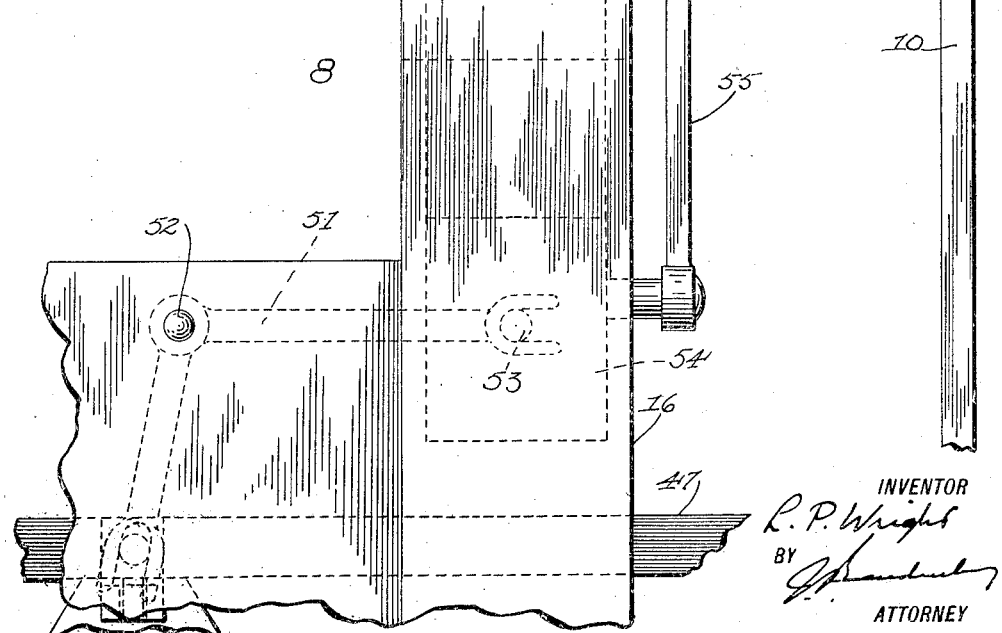
Fig. 9.

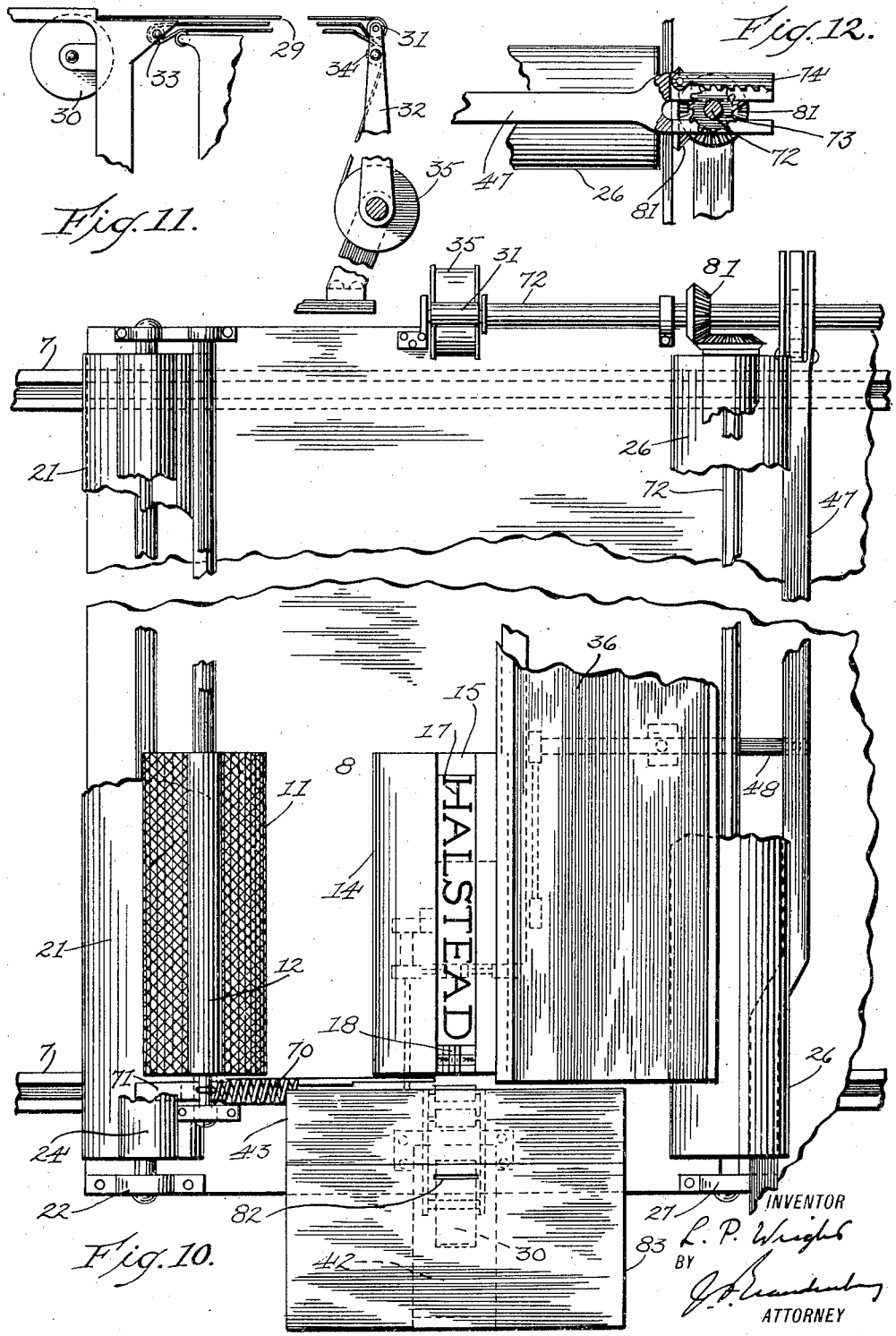

L. P. WRIGHT.
TICKET MACHINE.
APPLICATION FILED MAR. 17, 1920.

1,357,372.

Patented Nov. 2, 1920.
10 SHEETS—SHEET 9.

INVENTOR
L. P. Wright
BY
ATTORNEY

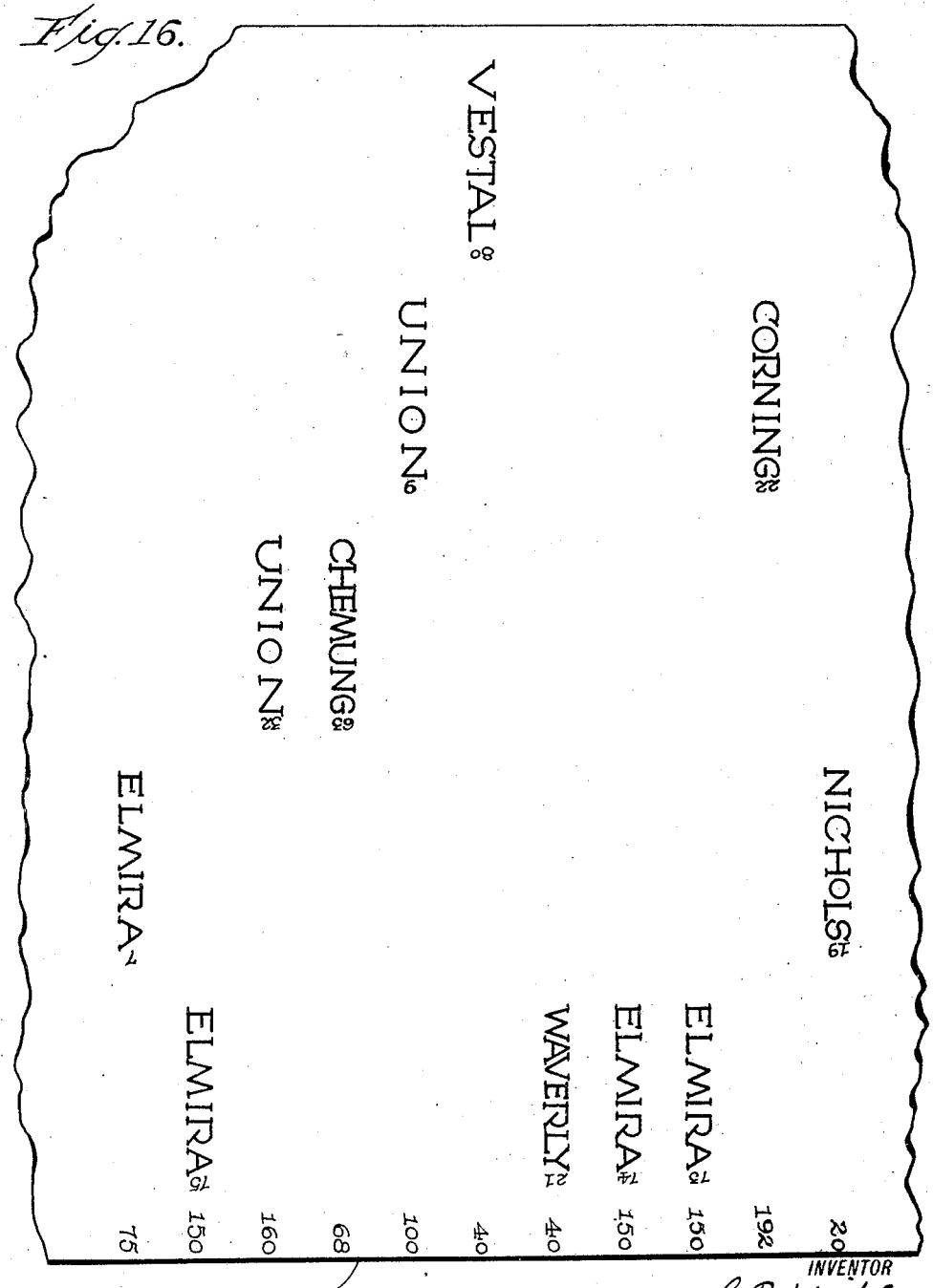

UNITED STATES PATENT OFFICE.

LESTER P. WRIGHT, OF OWEGO, NEW YORK.

TICKET-MACHINE.

1,357,372.  Specification of Letters Patent.  Patented Nov. 2, 1920.

Application filed March 17, 1920. Serial No. 366,694.

*To all whom it may concern:*

Be it known that I, LESTER P. WRIGHT, a citizen of the United States, and resident of Owego, in the county of Tioga and State of New York, have invented a new and useful Ticket-Machine, of which the following is a specification.

The invention is an improved machine for use in railroad ticket offices for preparing tickets to different destinations from standard blanks, at the same time preserving a record for the auditor. The object is to provide a machine adapted for expeditious use, and capable of issuing several classes of tickets, as full-fare, half-fare, return full-fare, return half-fare, and excursion, the tickets of each destination in each class consecutively numbered, and which preserves a record of all tickets of all classes in separate columns upon a common audit sheet, whereon the amounts of the fares are also recorded in another column, and which will also back-stamp the tickets with the selling station and the date. With these and other objects in view as will become apparent, the invention comprises the parts, improvements and combinations hereinafter described and more particularly set forth in the claims, it being understood that the embodiment shown and described is primarily illustrative and that numerous changes may be made without departing from essentials.

In the accompanying drawings forming a part hereof:

Fig. 9 is a front elevation of Fig. 8, with parts broken away and in section;

Fig. 10, is a top plan of the carriage, with portions broken away and the face-printing means omitted;

Fig. 11 is a detail of the ink-ribbon mechanism, with the intermediate portions of the courses of the ribbon broken away;

Fig. 12 is a detail of the ribbon and audit-sheet feed;

Fig. 16 is a plan of a portion of the audit sheet as it is filled out by the machine.

Figure 13:
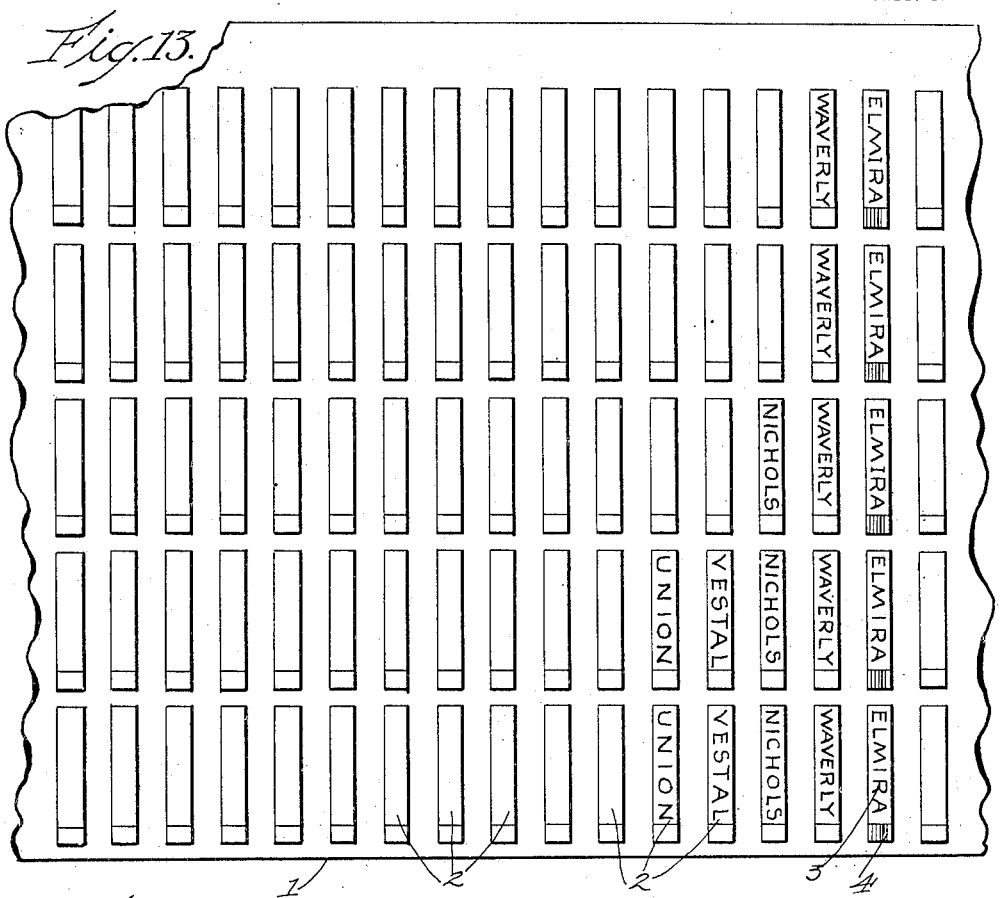
Fig. 13 is a bottom plan of the table, only a portion of the destination designations being shown.
Figure 14:
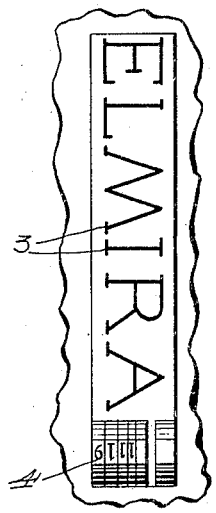
Fig. 14 is a bottom plan of one of the destination-printing and numbering members in the table.
Figure 15:
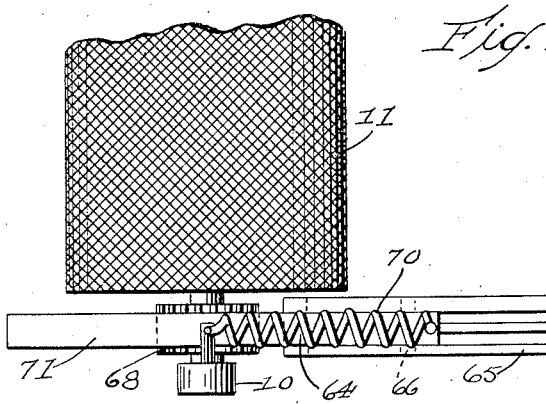
Fig. 15 is a fragmentary plan of one of the ticket-blank feeds.

In Figs. 11 and 13 illustrating the printing members, the characters actually read backward but are shown reading forward for convenience.

A table 1 bears a plurality of series of destination-printing and numbering members 2 on its under side (Fig. 13). Each of these members comprises type 3 or other printing surfaces to print the name of a station, and a numberer 4. The numberers may be ordinary contact-operated numbering heads, and require no special description. The series of members 2 are preferably arranged in straight lines. Each series is for a different class of ticket. In this case there are five series, for the five classes of tickets previously referred to. The series are duplicates of each other, containing destination designations reading in the same order. Thus the members of any one of the rows across the series all bear the same designation.

A carriage 5 is mounted with wheels 6 to run upon tracks 7 beneath the table, lengthwise of the series of members 2. This carriage bears a series of ticket-blank mechanisms, marked generally 8, there being as many of these mechanisms as there are series of members 2. Said series of mechanisms is disposed transversely of the series of members 2 and to the direction of carriage movement, so that in each of the positions of the carriage the mechanisms will be opposite a cross-row of the members 2. The table 1 and carriage 2 constitute embodiments of means for supporting the members 2 and mechanisms 8 for relative selective movement along the series of members.

Each of the mechanisms 8 has a ticket-blank roll 9 mounted on suitable frame members 10 on the carriage, and means including a feed roll 11 and a rubber-covered pressure roll 12 for advancing the strip 13 to a suitable guide 14 in proximity to an upwardly-acting plunger 15.

The blanks of the strip are previously printed with the matter common to all tickets of the class, but without the individual matter, namely the destination and the number of the ticket upon the face, and the selling station and the date of sale upon the back. The plunger with suitable mechanism for operating the same constitutes a means for producing impression movement between the ticket-blank mechanism and a selected member 2 in the table. Each of the mechanisms 8 has a plunger 15 and operating mechanism, and any one of the plungers of the series of mechanisms can be operated to produce an impression with the corresponding one of a selected transverse row of members 2. The plungers of the mechanisms are spaced apart on centers by distances corresponding to the spacing of the series of members 2, consequently the transverse series of plungers can be brought beneath and opposite any transverse row of face-stamping members. As heretofore explained each of the members 2 of these transverse rows prints the name of the same destination, one being for full-fares to that station, another for half-fares to the same station, and so on, and each having its individual numbering device, so that the tickets of each class to the same destination are consecutively numbered.

The ticket blank rolls 9 are preferably arranged with their axes transverse to the direction of selective movement, that is to say, at right angles to the tracks 5; and the ticket blanks are fed in operative position in the direction of said movement, that is to say lengthwise or tangentially with respect to the series of members 2. The plungers 15 are slidably guided in the upper parts of standards 16 on the carriage. The plungers 15 may be simple impression members. Preferably, however, they are constituted also as back-stamping members, each bearing printing surfaces 17 for the name of the selling station and a dater 18 (Fig. 10). The ticket blanks will thus be stamped simultaneously on both faces. If the members 15 are merely impression members, the back-stamping may be effected otherwise.

Each of the duplicate mechanisms on the carriage also includes a vertically movable knife member 19 coöperating with a stationary knife member 20 at the far side of the guide 14, and means hereinafter described for operating the feed roll 11.

Figure 8:
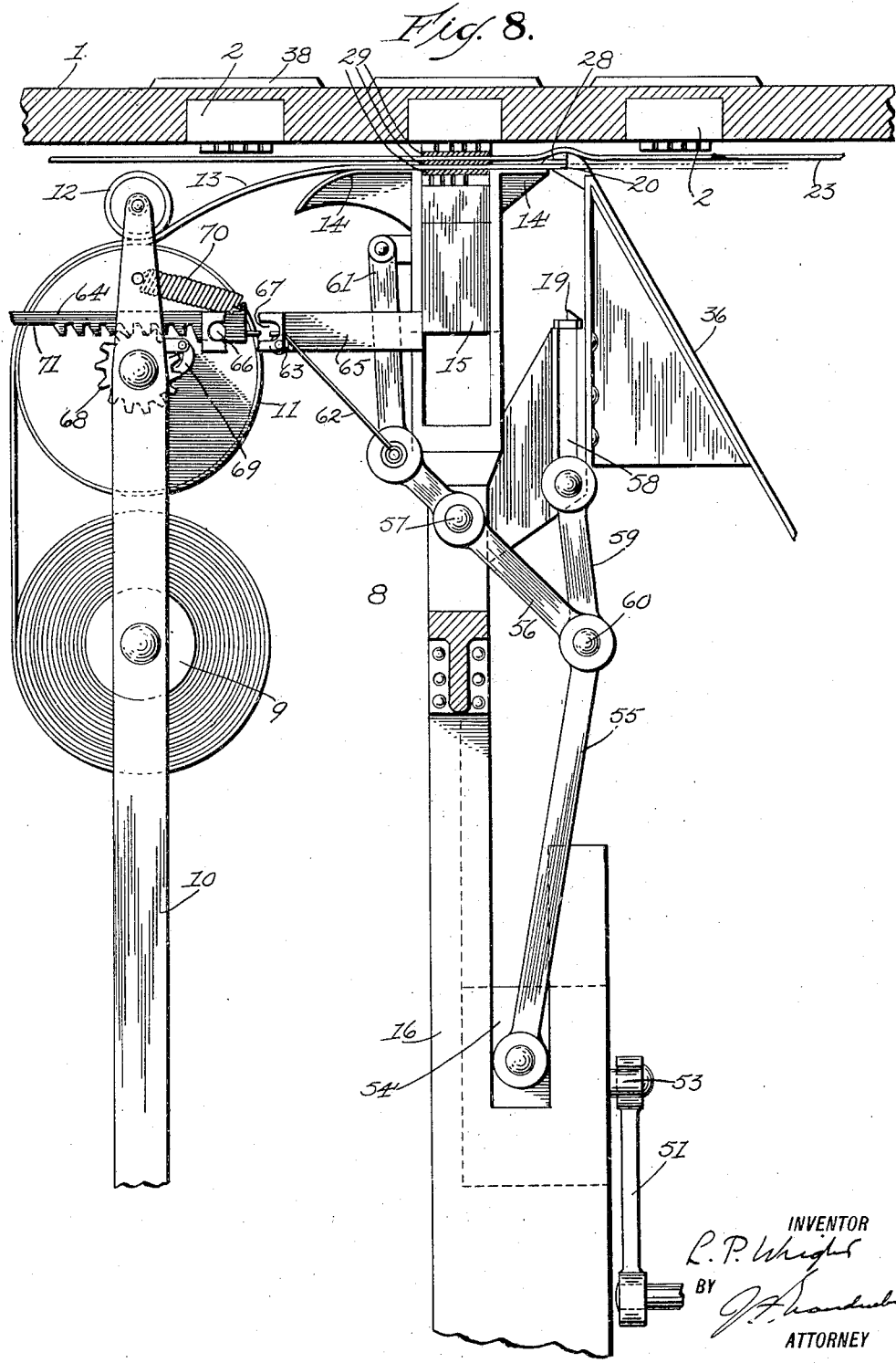
Fig. 8 shows a portion of Fig. 6 on a larger scale with parts in a different operating position, and with an intermediate portion in the lateral direction broken away in order to bring the mechanisms closer together for illustration.

A common audit-sheet roll 21 extends substantially the width of the carriage, including all the mechanisms 8, said roll being supported in frame members 22. The audit-sheet 23 passes from this roll up over a guide roll 24, thence substantially horizontally beneath the table 1, between the ticket blanks 13 and the members 2, over the plungers 15 of all the mechanisms 8 on the carriage, over another guide 25 and downward to a take-up roll 26 on frame members 27 on the carriage. In its operative course the audit-sheet passes in the direction of relative movement between the carriage 5 and the table 1, and therefore parallel with the line of movement of the ticket blank strips 13. In order to prevent the audit-sheet being cut it is caused to pass clear of the fixed and stationary parts 20, 19 of the cut-off, the sheet being protected by a deflecting guide 28 over the stationary cutting part 20, as seen in Fig. 8.

Figure 1:
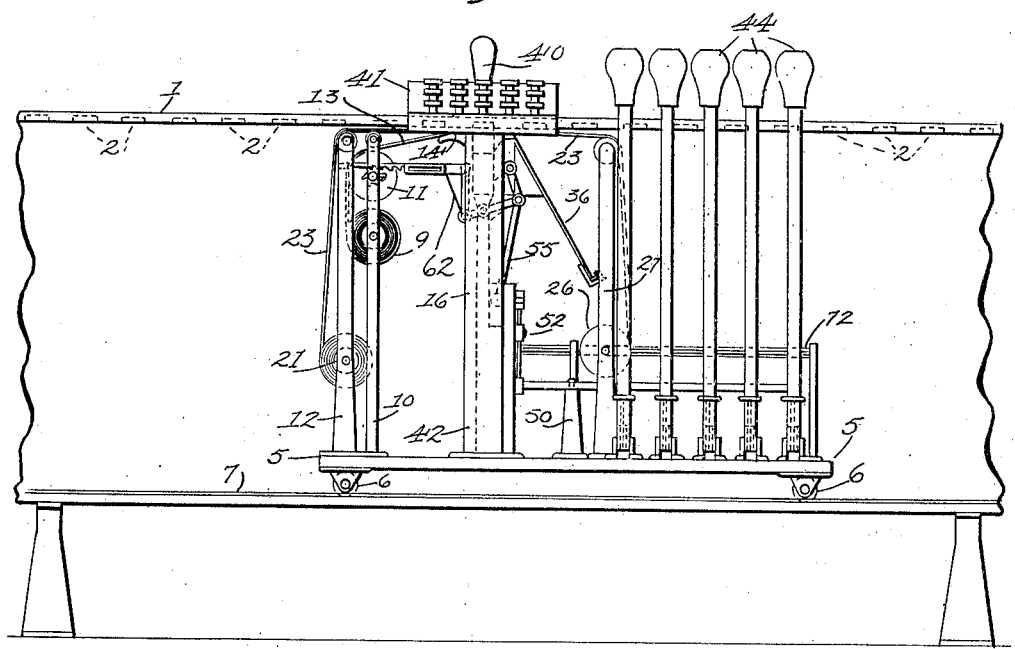
Figure 1 is a front elevation, showing a part of the extent of the machine.
Figure 2:
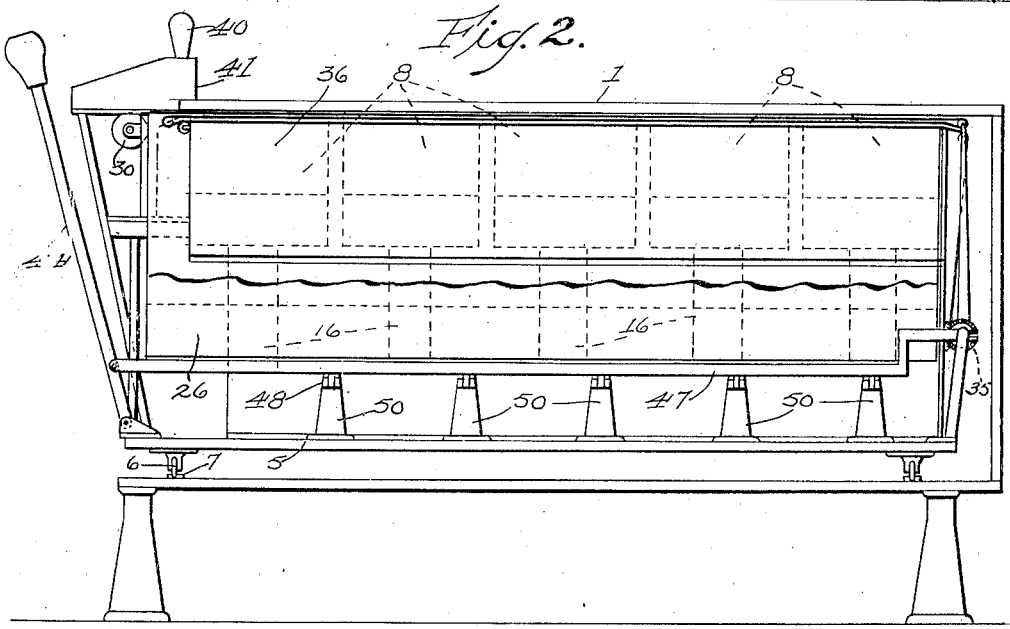
Fig. 2 is a side elevation, with the portion of the audit sheet in front broken away.
Figure 3:
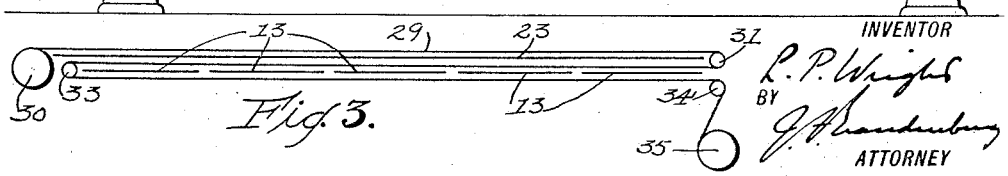
Fig. 3 is a diagrammatic view indicating the relation between the ticket-blank strips, the audit sheet, and the ink-ribbon courses.
Figure 4:
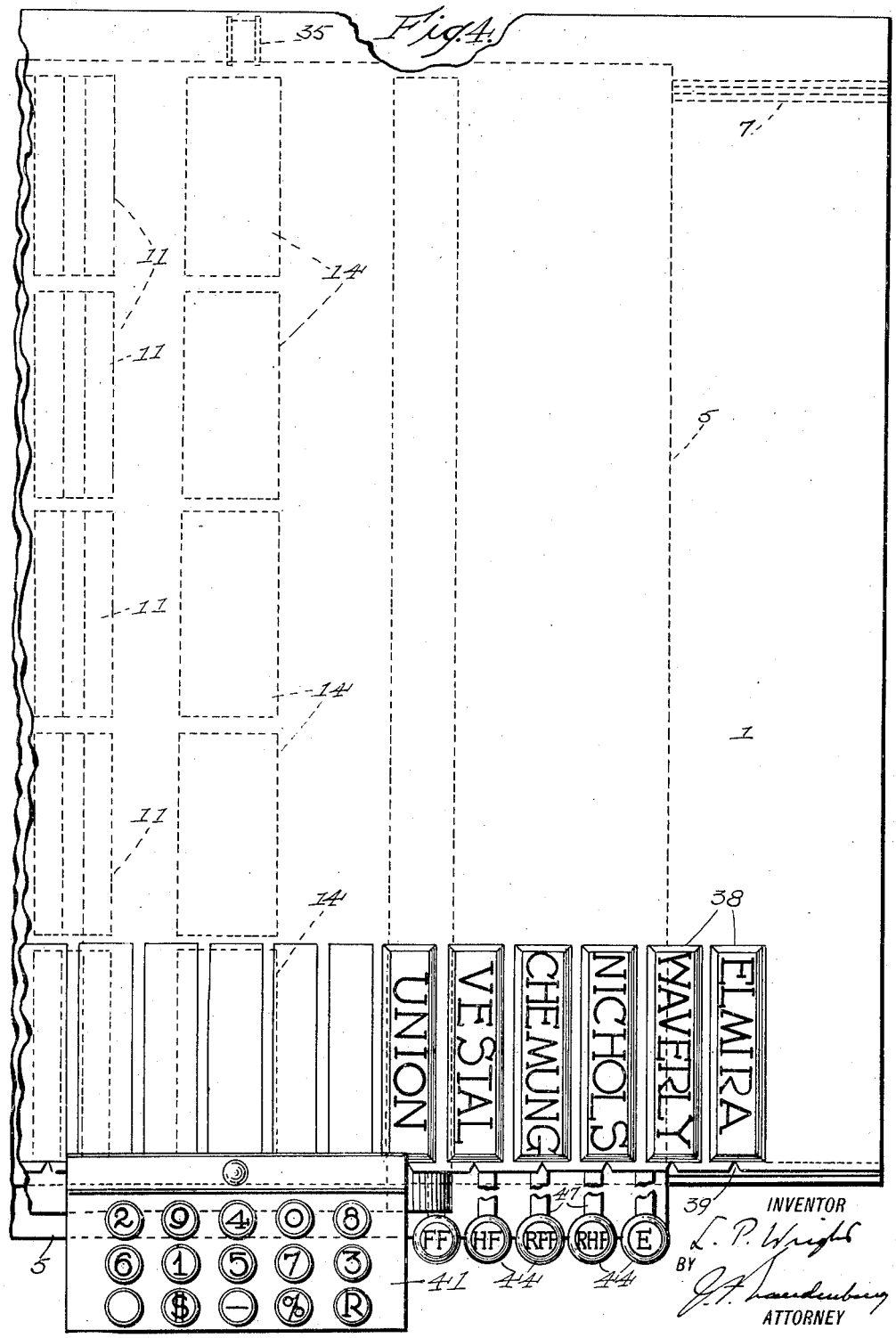
Fig. 4 is a partial top plan on a larger scale.

An ink ribbon 29 passes transversely of the carriage, at right angles to the movement thereof and to the direction of feed of the ticket-strips and audit-sheet. As seen in Figs. 3 and 11 this ribbon is unwound from a roll 30 on the framework at the front of the carriage, thence passes rearward in one horizontal course between the audit-sheet and the table 2, directly above the plungers 15, around a guide 31 on frame members 32 at the back of the carriage, thence forward in another course between the audit-sheet and the ticket-blanks to a front guide roll 33, around this guide and back through another horizontal course between the ticket blanks and the plungers 15, over a guide 34 at the back, and down to a take-up roll 35. I do not, however, limit myself to the use of a single ribbon. The ribbon, it will be observed, passes entirely at one side of the knife 19, 20.

When an impression is made the characters on the selected member 2 print through the ink ribbon onto the audit-sheet, and through the audit-sheet and the ribbon again upon the face of the ticket. Through the lowest course of the ribbon the back-stamping characters on the plunger 15 print upon the back of the ticket.

A common apron chute 36 extending transversely of the carriage receives the tickets after they have been stamped and cut off. A drawer 37 at the bottom of this chute may be pulled forward in order to obtain the ticket without reaching in.

The carriage 5 is movable along its guides by hand. On the top of the table, at the forward longitudinal edge, are name plates 38 corresponding in position and designation with the transverse rows of members 2 beneath the table. The edge of the table may be notched as indicated at 39 to coöperate with a suitable or common form of position lock operated by a handle 40, and which it is not thought necessary to illustrate.

Means are provided whereby, at any selected position, any one of the transverse series of mechanisms 8 on the carriage produces an impression in coöperation with the corresponding member 2 of the selected cross row of said members, without operating the other mechanisms 8, and whereby the operation of any one of the mechanisms causes the operation of the common audit-sheet and ink-ribbon mechanisms. The sales of tickets of the different classes are thus printed in separate columns upon the audit-sheet, and each sale in all the columns is on a separate line (see Fig. 16).

Means are also provided for recording separately upon the audit-sheet in another column and on a line with the respective names and consecutive numbers, the amounts of the fares. To this end a simple form of adding machine or printing comptometer 41 is mounted on framework 42 at the front of the carriage. This machine is arranged to print the amounts of the fares upon the margin of the audit-sheet opposite the impressions made by the members 2. Such machines are well understood and the representation is intended to be merely illustrative. The machine prints against a platen 43 at the front of the carriage, beyond the edge of the table, the margin of the audit-sheet and the upper course of the ink-ribbon being caused to pass over this platen. The ink-ribbon passes from the spool 30 through a slot 82 in the support 83 of the face-printing machine, seen in Fig. 10.

The operating connections will be briefly described. On the forward part of the carriage adjacent the fare-recording machine is a group of hand levers 44, one for each class of fare. These levers have fulcrums 45 at their lower ends and are adapted to be pulled out and pushed back for a complete operation. Springs 46 hold them and the connected trains of connections in the normal condition. Each of the trains extends to one of the mechanisms 8 for operating the same, and all of them have operative connection with the audit-sheet and ink-ribbon mechanisms, so that whenever one of the mechanisms 8 is operated these other mechanisms are also operated. Each hand lever 44 is connected with the forward end of a rearwardly-extending longitudinally-movable bar 47, these bars being disposed side by side on the carriage.

Each of the bars operates a lever 48 extending laterally therefrom, toward the corresponding mechanism 8. Each of said levers is fulcrumed at the middle at 49 on a frame member 50 on the carriage, and one end has a slotted pivotal connection with its operating bar 47, and its other end similar connection with one end of a bell-crank lever 51, which is pivoted at 52 on the lower part of the corresponding standard 16, in the top of which the plunger 15 is slidably mounted. The other arm of the bell-crank has sliding pivotal connection with a stud 53 on a slide-block 54, which is vertically guided in the standard. To the slide-block is pivoted the lower end of a link 55, the upper end of which is pivoted to a two-armed lever 56, fulcrumed at 57 on the standard. The body 58 of the vertically-movable knife member 19 is connected by a pivotal link 59 with one end of the lever 56, at its pivotal connection 60 with the link 55. The other end of the lever connects with the plunger 15 by a pivotal link 61. A flexible strap 62 is also attached to this arm of the lever 56, and passes over a guide roller 63 to a rack bar 64, to the rear end of which it is fastened.

Said rack bar is slidable and tiltable in a bracket 65 projecting from the standard 16, this being conveniently accomplished by providing the bar with a pivot pin 66 the ends of which slide and turn in longitudinal slots 67 in the side portions of the bracket. The rack bar coöperates with a toothed wheel 68 on the axle of the ticket blank strip feed roll 11, the teeth of the rack and wheel being inclined so that there is driving engagement on the rearward movement of the rack bar, but not on its forward movement, during which the bar slides idly over the wheel. A dog 69 prevents retrograde movement of the wheel and roll. The rack bar is restored to normal position by a spring 70 connecting its rear portion with one of the frame members 10, the relation of this spring being such as also to hold the rack bar against the wheel. The outer portion 71 of the rack bar is free of teeth and smooth, so that after a predetermined extent of driving movement, calculated to be sufficient to advance the ticket blank strip one blank length, the feed stops.

The foregoing is a description of the operating connections for one of the mechanisms 8 on the carriage. The connections of all the mechanisms are similar, except that the levers 48 are connected with the bars 47 at different points along the length thereof, and are themselves of different lengths, in order to reach their respective mechanisms. Pulling out one of the levers 44 draws forward the connected bar 47, and this rocks the connected lever 48. Said lever in turn rocks its bell-crank 51, and the latter pulls down the slide-block 54. The link 55 descending rocks the two-armed lever 56, thereby raising the plunger 15 to produce an impression. At this time the knife member 19 is being pulled down, and the flexible connection 62 is let off, enabling the spring 70 to move the rack bar 64 idly over the ratchet wheel 68 to assume a position from which it will be moved in the next operation to advance the ticket blank strip 13 the extent of one blank. The end blank, which was over the plunger 15 and beneath the selected table member 2, has thus been stamped. The operator now moves the hand lever 44 back to normal position, thereby moving the several connections in the reverse directions. The plunger 15 is thereby lowered to its normal position, the rack bar 64 is drawn rearward revolving the ticket blank feed roll 11, so as to advance the stamped blank beyond the guide 14, and the knife member 19 is raised. When the division region in the strip reaches the stationary knife member 20, and before the movable knife member 19 encounters the strip, the last tooth of the rack bar passes out of engagement with the wheel 68 and the ticket becomes stationary, while the knife member 19 completes its movement and cuts it off; the severed ticket dropping down the chute 36.

The connections whereby the audit-sheet and ink-ribbon mechanisms are operated with the operation of each of the ticket-blank mechanisms will next be described.

Figure 5:
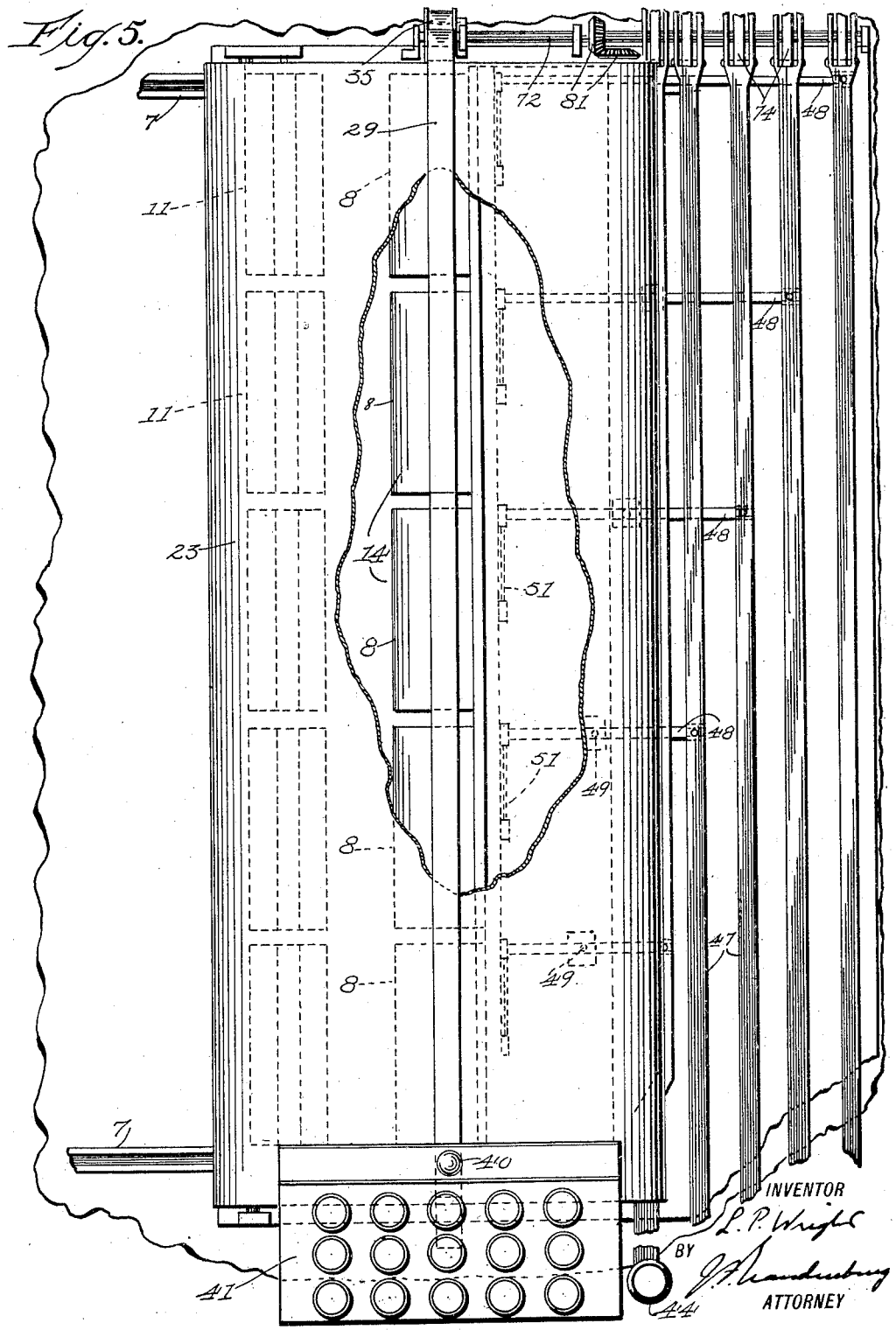
Fig. 5 is a top plan view with the table removed and the audit sheet partly broken out.
Figure 6:
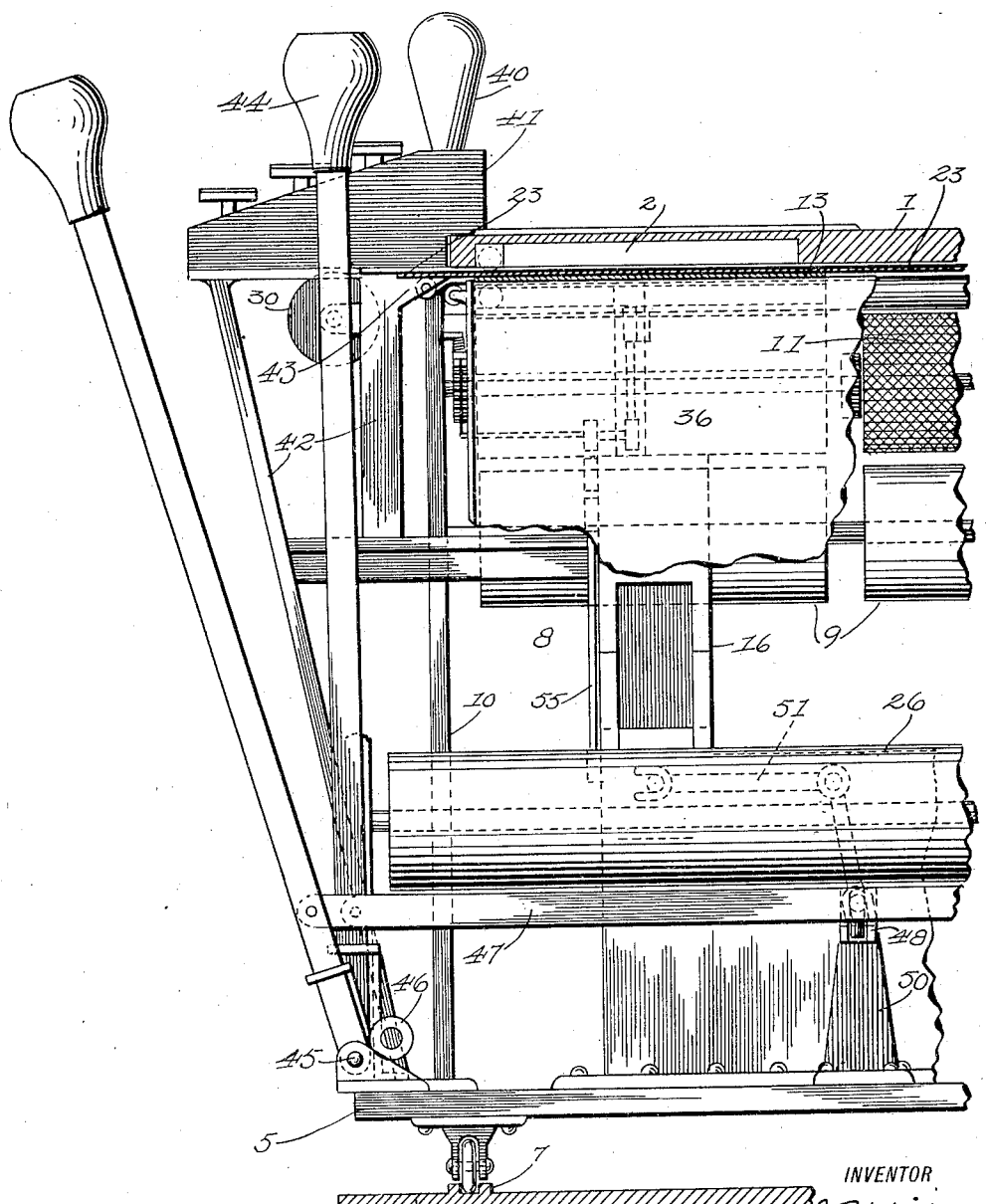
Fig. 6 is an enlarged sectional side elevation, showing parts at the left-hand end of Fig. 2, with portions broken away, and with one of the operating levers in actuated position.
Figure 7:
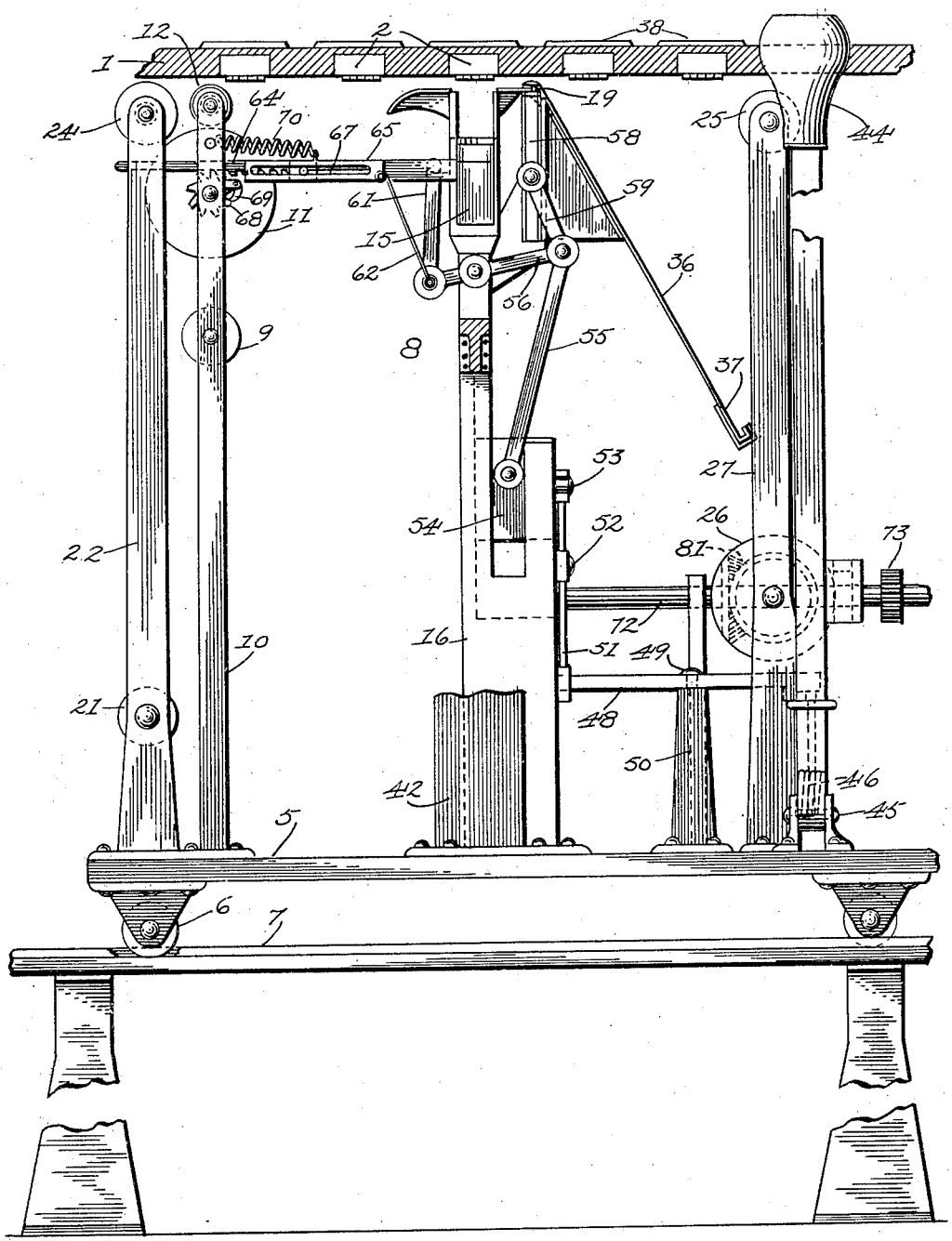
Fig. 7 is a front view of the parts shown in Fig. 5, with certain parts broken away and sectioned, the operating parts being shown in normal condition.

The take-up roll 26 of the audit-sheet 23 is operated by bevel gears 81 (Figs. 5 and 16) from a common shaft 72 extending along the rear of the carriage 5, parallel or tangential with its direction of movement. Said shaft 72 carries a series of ratchet wheels 73 (Fig. 12) one for each of the ticket-blank mechanisms. These ratchet wheels coöperate with pivoted ratchet-toothed racks 74 on the rear ends of the several operating bars 47, the arrangement of the teeth being such that when any one of the hand levers 44 is pulled out, the corresponding rack 74 latches idly over its wheel, so that the shaft is not turned, while on the return movement the teeth engage and the shaft is revolved a predetermined distance. This advances the audit-sheet one step, so as to bring a fresh portion over the plungers 15. When the shaft 72 is revolved by one of the racks 74 acting upon one of the ratchet wheels 73, the other ratchet wheels turn idly beneath their stationary racks.

The take-up roll 35 (Figs. 10 and 11) of the ink-ribbon is also on the shaft 72, so that the ribbon is also advanced a step after each impression.

While an embodiment of operating connections has been described in detail, it will be understood that I do not limit myself thereto, as other trains, utilizing the operator's power either direct or to control a motor, will suggest themselves to skilled mechanics; and in general numerous changes in form, proportions and arrangements may be made without departing from the invention.

What I claim as new is:

1. In a ticket-machine, the combination of a plurality of series of destination-printing and numbering members, a series of ticket-blank mechanisms transverse to said series of members, means supporting said members and mechanisms as two groups for relative selective movement along the series of members, and means for producing impression movement between any one of the ticket-blank mechanisms and the corresponding one of the selected set of destination-printing and numbering members.

2. In a ticket-machine, the combination of a plurality of series of destination-printing and numbering members, a series of ticket-blank mechanisms transverse to said series of members, means supporting said members and mechanisms as two groups for relative selective movement along the series of members, and operating means associated with the ticket-blank mechanisms for pressing the ticket-blanks against the destination-printing and numbering members.

3. In a ticket-machine, the combination of a stationary table containing a plurality of series of destination-printing and numbering members, a series of ticket-blank mechanisms transverse to said series of members, a common carriage whereon said mechanisms are mounted for selective movement along the series of members, and means for producing impression movement between any one of the ticket-blank mechanisms and the corresponding one of the selected set of destination-printing and numbering members.

4. In a ticket-machine, the combination of a stationary table containing a plurality of series of destination-printing and numbering members upon its under side, a carriage movable beneath the table, a series of ticket-blank mechanisms on said carriage transverse to the series of members beneath the table, upwardly-acting impression-producing members on the carriage, and means for operating any one of said impression-producing members.

5. In a ticket-machine, the combination of a stationary table containing a plurality of rectilinear series of destination-printing and numbering members, a carriage movable lengthwise of said series, a transverse series of ticket-blank mechanisms and plungers on said carriage, and means for operating any one of said plungers.

6. In a ticket-machine, the combination of a plurality of series of destination-printing and numbering members, a transverse series of plungers, a series of mechanisms for supplying ticket-blanks between said members and plungers, means for operating any one of the plungers, and means supporting the destination-printing and numbering members on the one hand and the plungers and blank-supplying mechanisms on the other for relative selective movement along the series of members.

7. In a ticket-machine, the combination of a stationary table containing a plurality of series of destination-printing and numbering members, a carriage movable along said series, a transverse series of plungers on the carriage, a series of mechanisms also on the movable carriage for supplying ticket-blanks between the plungers and members in the table, and means for operating any one of said plungers.

8. In a ticket-machine, the combination of a plurality of series of destination-printing and numbering members, a transverse series of ticket-blank mechanisms, means supporting said members and mechanisms as two groups for relative selective movement along the series of members, means for producing impression movement between any one of the ticket-blank mechanisms and the corresponding one of a selected set of destination-printing and numbering members, and audit-sheet means common to all the ticket-blank mechanisms.

9. In a ticket-machine, the combination of a table containing a plurality of series of destination-printing and numbering members, a carriage movable along said series, a transverse series of ticket-blank mechanisms on said carriage, and common audit-sheet means also on the movable carriage.

10. In a ticket-machine, the combination of a table containing a plurality of series of destination-printing and numbering members, a carriage movable along said series, a transverse series of ticket-blank mechanisms on said carriage, means for producing impression movement between any one of the ticket-blank mechanisms and one of a selected set of members in the table, and means for passing a common audit-sheet between said mechanisms and the table.

11. In a ticket-machine, the combination of a plurality of series of destination-printing and numbering members, a transverse series of ticket-blank mechanisms, means supporting said members and mechanisms as two groups for relative selective movement along the series of members, means for producing impression movement between any one of the ticket-blank mechanisms and the corresponding one of a selected set of destination-printing and numbering members, and means for passing a common audit sheet between the ticket-blank mechanisms and the destination-printing and numbering members.

12. In a ticket-machine, the combination of a plurality of series of destination-printing and numbering members, a transverse series of plungers, means for operating any one of said plungers, a series of mechanisms for supplying ticket-blanks between said plungers and members, means for passing a common audit-sheet between the ticket-blanks and the destination-printing and numbering members, and means supporting said members on the one hand and the plungers, blank-supplying mechanisms and audit-sheet means on the other for relative selective movement along the series of members.

13. In a ticket-machine, the combination of a table containing a plurality of series of destination-printing and numbering members, a support for parts beneath the table, said table and support being relatively movable along the series of members, and parts on said support comprising a series of upwardly-acting plungers transverse to the series of members, means for operating any one of said plungers, means for supplying ticket-blanks between said plungers and the members in the table, and means for passing a common audit-sheet between the ticket blanks and said members.

14. In a ticket-machine, the combination of a plurality of series of destination-printing and numbering members, a transverse series of plungers, means for operating any one of said plungers, a series of mechanisms for supplying ticket-blanks between said plungers and members, means for passing a common audit-sheet between the ticket-blanks and the destination-printing and numbering members, means for passing ink-ribbon between the audit-sheet and the ticket-blanks, and means supporting said members on the one hand and the plungers, blank-supplying mechanisms and audit-sheet means on the other for relative selective movement along the series of members.

15. In a ticket-machine, the combination of a plurality of series of destination-printing and numbering members, a transverse series of plungers, means for operating any one of said plungers, a series of mechanisms for supplying ticket-blanks between said plungers and members, means for passing a common audit-sheet between the ticket-blanks and the destination-printing and numbering members, means for passing ink-ribbons between the audit-sheet and the ticket-blanks and between the ticket-blanks and the destination-printing and numbering members, and means supporting said members on the one hand and the plungers, blank-supplying mechanisms and audit-sheet means on the other for relative selective movement along the series of members.

16. In a ticket-machine, the combination of a plurality of series of destination-printing and numbering members, a transverse series of ticket-blank mechanisms, means supporting said members and mechanisms as two groups for relative selective movement along the series of members, audit-sheet means common to all the ticket-blank mechanisms, means for producing impression movement between any one of said mechanisms and the corresponding one of a selected set of destination-printing and numbering members to make an impression upon the blank and also upon the audit-sheet, and means for separately recording fares upon the audit-sheet.

17. In a ticket-machine, the combination of a plurality of series of destination-printing and numbering members, a transverse series of ticket-blank mechanisms, means supporting said members and mechanisms as two groups for relative selective movement along the series of members, audit-sheet means common to all the ticket-blank mechanisms, means for producing impression movement between any one of said mechanisms and the corresponding one of a selected set of destination-printing and numbering members to make an impression upon the blank and also upon the audit-sheet, and means mounted with the ticket-blank mechanisms for recording fares upon the margin of the audit-sheet.

18. In a ticket-machine, the combination of a plurality of series of destination-printing and numbering members, a transverse series of ticket-blank mechanisms, means supporting said members and mechanisms as two groups for relative selective movement along the series of members, means for passing a common audit-sheet in the direction of relative selective movement, and means for producing impression movement between any one of the ticket-blank mechanisms and the corresponding one of a selected row of destination-printing and numbering members.

19. In a ticket-machine, the combination of a plurality of series of destination-printing and numbering members, a transverse series of ticket-blank mechanisms, means supporting said members and mechanisms as two groups for relative selective movement along the series of members, means for passing a common audit-sheet in the direction of relative selective movement, means for producing impression movement between any one of the ticket-blank mechanisms and the corresponding one of a selected row of destination-printing and numbering members, the impressions thus produced upon the audit-sheet appearing in parallel columns for different classes of fares, and means for recording the amounts of all fares in another column.

20. In a ticket-machine, the combination of a plurality of series of destination-printing and numbering members, a transverse series of ticket-blank mechanisms, means supporting said members and mechanisms as two groups for relative selective movement along the series of members, means for passing a common audit-sheet in the direction of relative selective movement, means for producing impression movement between any one of the ticket-blank mechanisms and the corresponding one of a selected row of destination-printing and numbering members, the impressions thus produced upon the audit-sheet appearing in parallel columns for different classes of fares, and means for recording the amounts of the fares on the margin of the sheet.

21. In a ticket-machine, the combination of a series of destination-printing and numbering members, a ticket-blank mechanism, means supporting said series of members and the ticket-blank mechanism for relative selective movement along the series, means for producing impression movement between the ticket-blank mechanism and the selected destination-printing and numbering member, and means for passing an audit-sheet between the ticket-blank and the member, the impression being made through the audit-sheet upon the blank.

22. In a ticket-machine, the combination of a series of destination-printing and numbering members, a ticket-blank mechanism, means supporting said series of members and the ticket-blank mechanism for relative selective movement along the series, means for producing impression movement between the ticket-blank mechanism and the selected destination-printing and numbering member, means for passing an audit-sheet between the ticket-blank and the member, and means for passing an ink-ribbon between the audit-sheet and the blank.

23. In a ticket-machine, the combination of a series of destination-printing and numbering members, a ticket-blank mechanism, means supporting said series of members and the ticket-blank mechanism for relative selective movement along the series, means for producing impression movement between the ticket-blank mechanism and the selected destination-printing and numbering member, means for passing an audit-sheet between the ticket-blank and the member, and means for passing an ink-ribbon between the audit-sheet and the blank and between the audit-sheet and the destination-printing and numbering member.

24. In a ticket-machine, the combination of a plurality of series of destination-printing and numbering members, a transverse series of ticket-blank mechanisms, means supporting said members and mechanisms as two groups for relative selective movement along the series of members, means for passing a common audit-sheet in the direction of relative selective movement, means for passing an ink-ribbon at right angles to the direction of feed of the audit-sheet, and means for producing impression movement between any one of the ticket-blank mechanisms and the corresponding one of a selected row of destination-printing and numbering members.

25. In a ticket-machine, the combination of a plurality of series of destination-printing and numbering members, a transverse series of ticket-blank mechanisms, means supporting said members and mechanisms as two groups for relative selective movement along the series, said ticket-blank mechanisms comprising means arranged to feed ticket-blanks in parallel paths in the direction of selective movement, means for passing a common audit-sheet in the same direction, and means for passing an ink-ribbon at right angles.

26. In a ticket-machine, the combination of a series of destination-printing and numbering members, a ticket-blank mechanism, means supporting said members and mechanism for relative selective movement along the series, means for producing impression movement between the ticket-blank mechanism and the selected member, means for passing an ink-ribbon at right angles to the direction of feed of the ticket-blank, and a cut-off for the ticket.

27. In a ticket-machine, the combination of a series of destination-printing and numbering members, a ticket-blank mechanism, means supporting said members and mechanism for relative selective movement along the series, means for producing impression movement between the ticket-blank mechanism and the selected member, means for passing an audit-sheet in operative relation to the ticket-blank mechanism, an automatic knife for cutting off the tickets, and means protecting the audit-sheet from the knife.

28. In a ticket-machine, the combination of a series of destination-printing and numbering members, a ticket-blank mechanism, means supporting said members and mechanism for relative selective movement along the series, means for producing impression movement between the ticket-blank mechanism and the selected member, an automatic knife for cutting off the tickets, and means for passing an audit-sheet in the same direction as the ticket feed and out of range of the knife.

29. In a ticket-machine, the combination of a plurality of face-stamping members including each a destination designation and a numberer, a back-stamping member, means supporting said members for relative selective movement to bring the back-stamping member opposite any desired face-stamping member, means for supplying ticket-blanks between the members, means for also passing an audit-sheet between the members, and means for producing impression movement therebetween.

30. In a ticket-machine, the combination of a plurality of face-stamping members including each a destination designation and a numberer, a back-stamping member, means supporting said members for relative selective movement to bring the back-stamping member opposite any desired face-stamping member, means for supplying ticket-blanks between the members, means for passing an audit-sheet between the ticket-blank and the face-stamping member, and means for producing impression movement therebetween.

31. In a ticket-machine, the combination of a plurality of series of face-stamping members including each a destination designation and a numberer, a transverse series of back-stamping members, means for supporting said members as two groups for relative selective movement lengthwise of the series of face-stamping members, means for supplying ticket-blanks between the members, and means for producing impression movement therebetween.

32. In a ticket-machine, the combination of a plurality of series of face-stamping members including each a destination designation and a numberer, a transverse series of back-stamping members, means for supporting said members as two groups for relative selective movement lengthwise of the series of face-stamping members, means for supplying ticket-blanks between the members, means for likewise passing a common audit-sheet between the members, and means for producing impression movement therebetween.

33. In a ticket-machine, the combination of a plurality of face-stamping members including each a destination designation and a numberer, a back-stamping member, means supporting said members for relative selective movement to bring the back-stamping member opposite any desired face-stamping member, means for supplying ticket-blanks between the members, means for passing ink-ribbon at both sides of the ticket blank, and means for producing impression movement therebetween.

34. In a ticket-machine, the combination of a plurality of face-stamping members including each a destination designation and a numberer, a back-stamping member, means supporting said members for relative selective movement to bring the back-stamping member opposite any desired face-stamping member, means for supplying ticket-blanks between the members, means for also passing an audit-sheet between the members, means for passing two courses of ink-ribbon at opposite sides of the ticket-blank and a third course between the audit-sheet and the face-stamping member, and means for producing impression movement therebetween.

35. In a ticket-machine, the combination of a plurality of series of destination-printing and numbering members, a series of ticket-blank mechanisms, means supporting said members and mechanisms for relative selective movement, a common audit-sheet mechanism, means for operating any one of the ticket-blank mechanisms, and means whereby the audit-sheet mechanism is operated with the operation of each of said ticket-blank mechanisms.

LESTER P. WRIGHT.